United States Patent [19]

Rutter

[11] 4,045,877
[45] Sept. 6, 1977

[54] RETRACTABLE DIAL BORE GAUGE

[75] Inventor: Harold T. Rutter, Kirkwood, Mo.

[73] Assignee: Sunnen Products Company, St. Louis, Mo.

[21] Appl. No.: 665,892

[22] Filed: Mar. 11, 1976

[51] Int. Cl.[2] .............................................. G01B 5/12
[52] U.S. Cl. ................................ 33/178 R; 33/147 F; 33/147 K
[58] Field of Search ............ 33/147 F, 147 K, 178 R, 33/DIG. 8

[56] References Cited

U.S. PATENT DOCUMENTS

| 1,667,169 | 4/1928 | Ruck et al. | 33/178 R |
| 2,454,246 | 11/1948 | Worthen | 33/178 R |
| 3,026,622 | 3/1962 | Croshier et al. | 33/178 R |
| 3,316,650 | 5/1967 | Aldeborgh et al. | 33/178 R |
| 3,442,020 | 5/1969 | Worthen | 33/178 R |
| 3,827,154 | 8/1974 | Kaifesh | 33/147 M |

FOREIGN PATENT DOCUMENTS 1,458,510  10/1966  France ............................ 33/178 R Primary Examiner—Richard E. Aegerter
Assistant Examiner—Richard R. Stearns

[57] ABSTRACT

A dial bore gauge for measuring the size and surface characteristics of internal surfaces including surfaces which may include spaced portions to be gauged, said gauge including a gauging portion having spaced work engaging elements thereon, a dial portion for indicating the condition of the work engaging portions, members operatively connecting the gauging portions with the dial portion, and an actuator element operatively connected to the gauging portions and movable between different selected positions in one of which at least one of the work engaging elements is in a retracted condition and in another of which all of the work engaging elements are in their work engaging positions.

20 Claims, 13 Drawing Figures

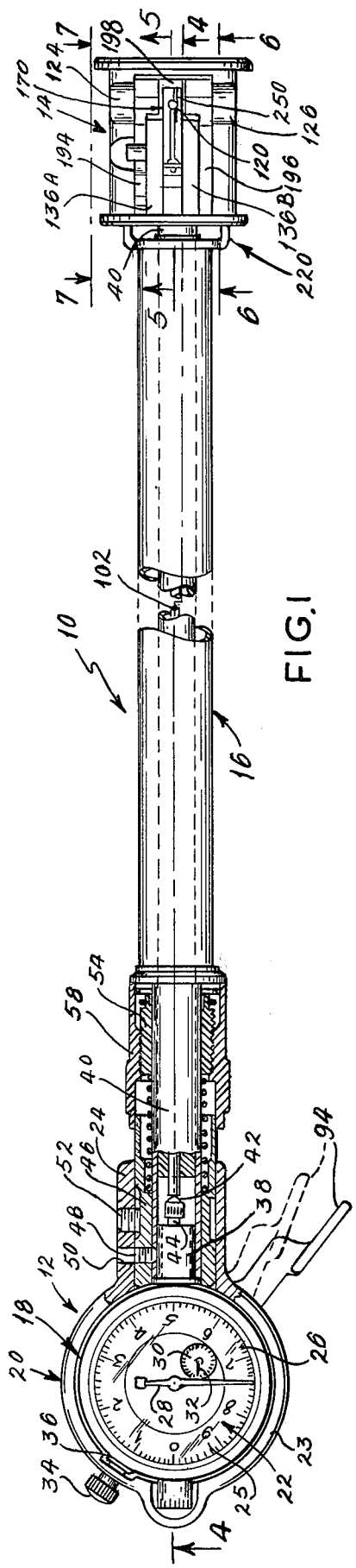
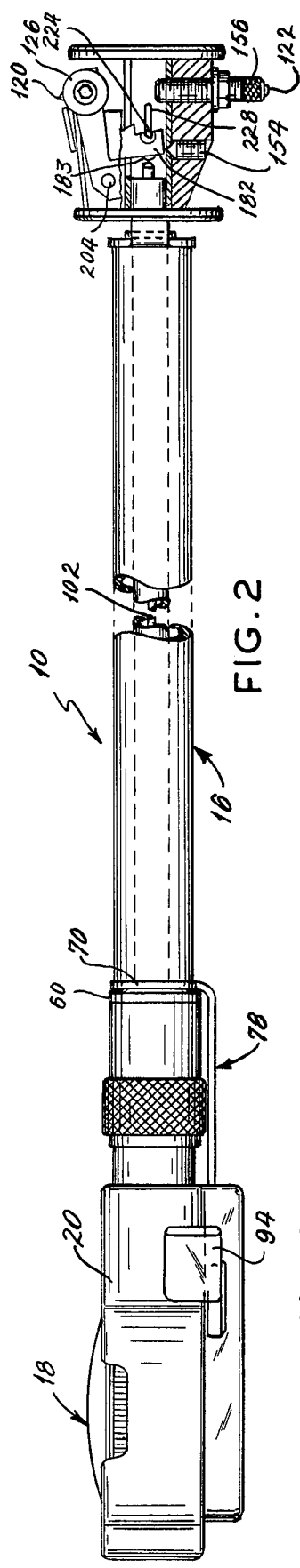
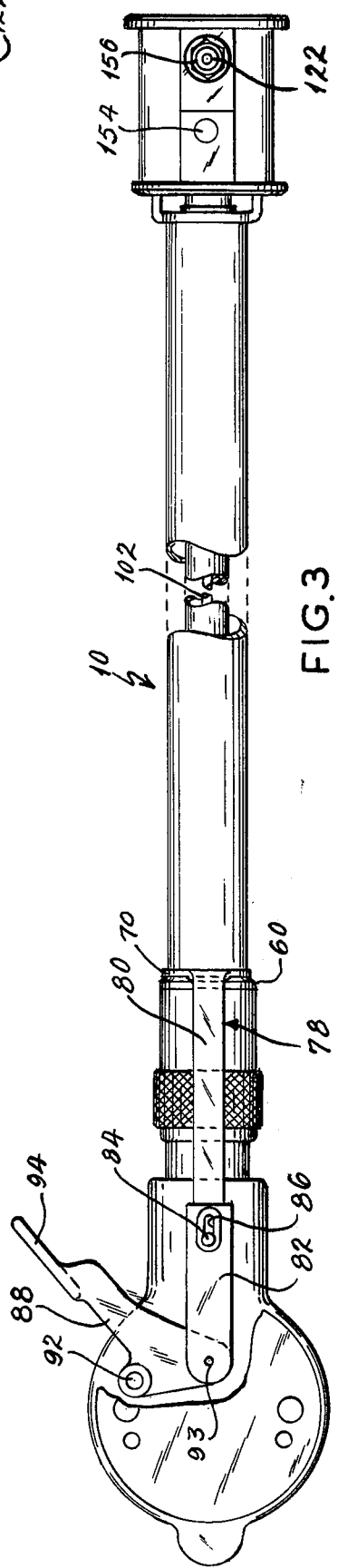

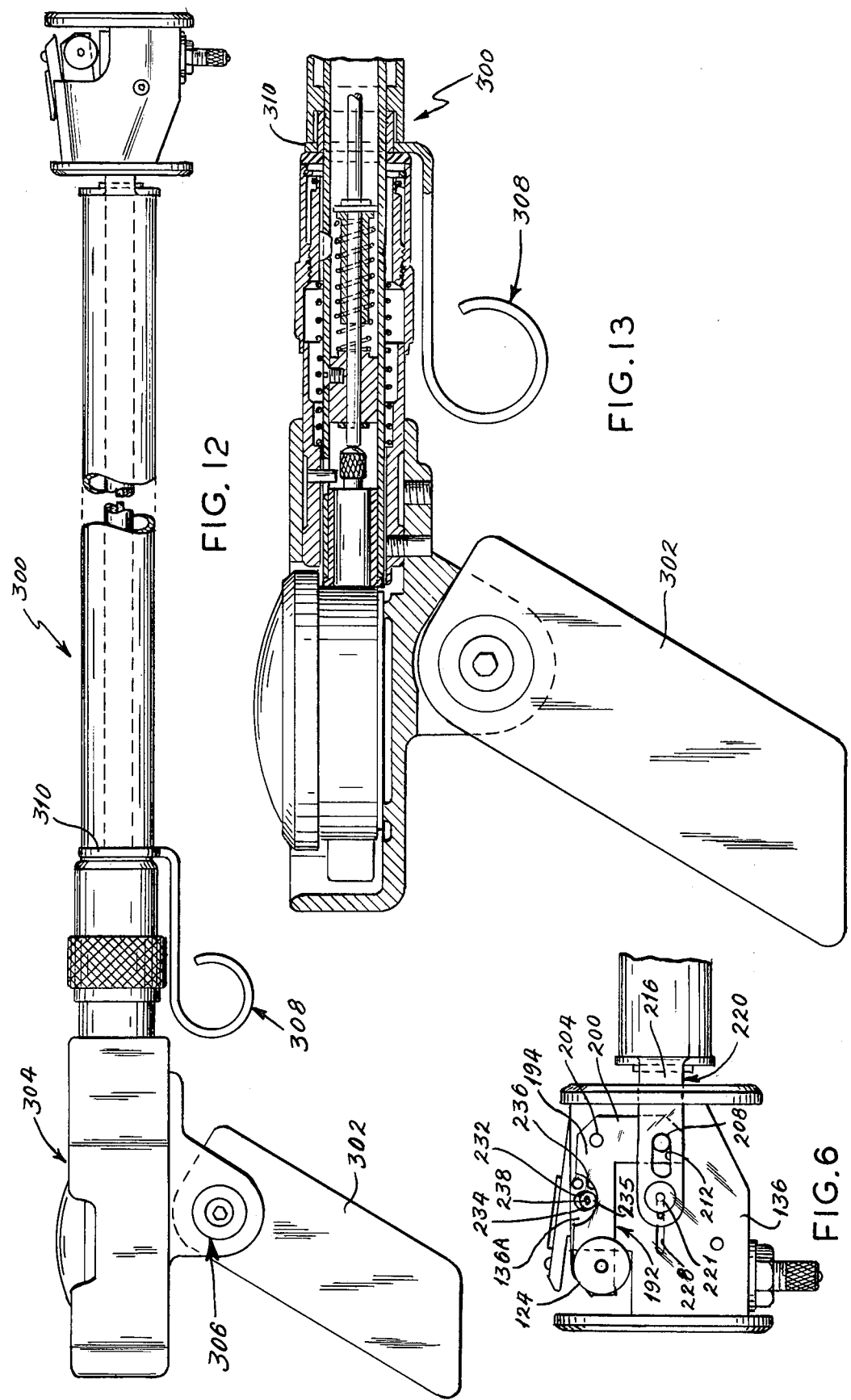

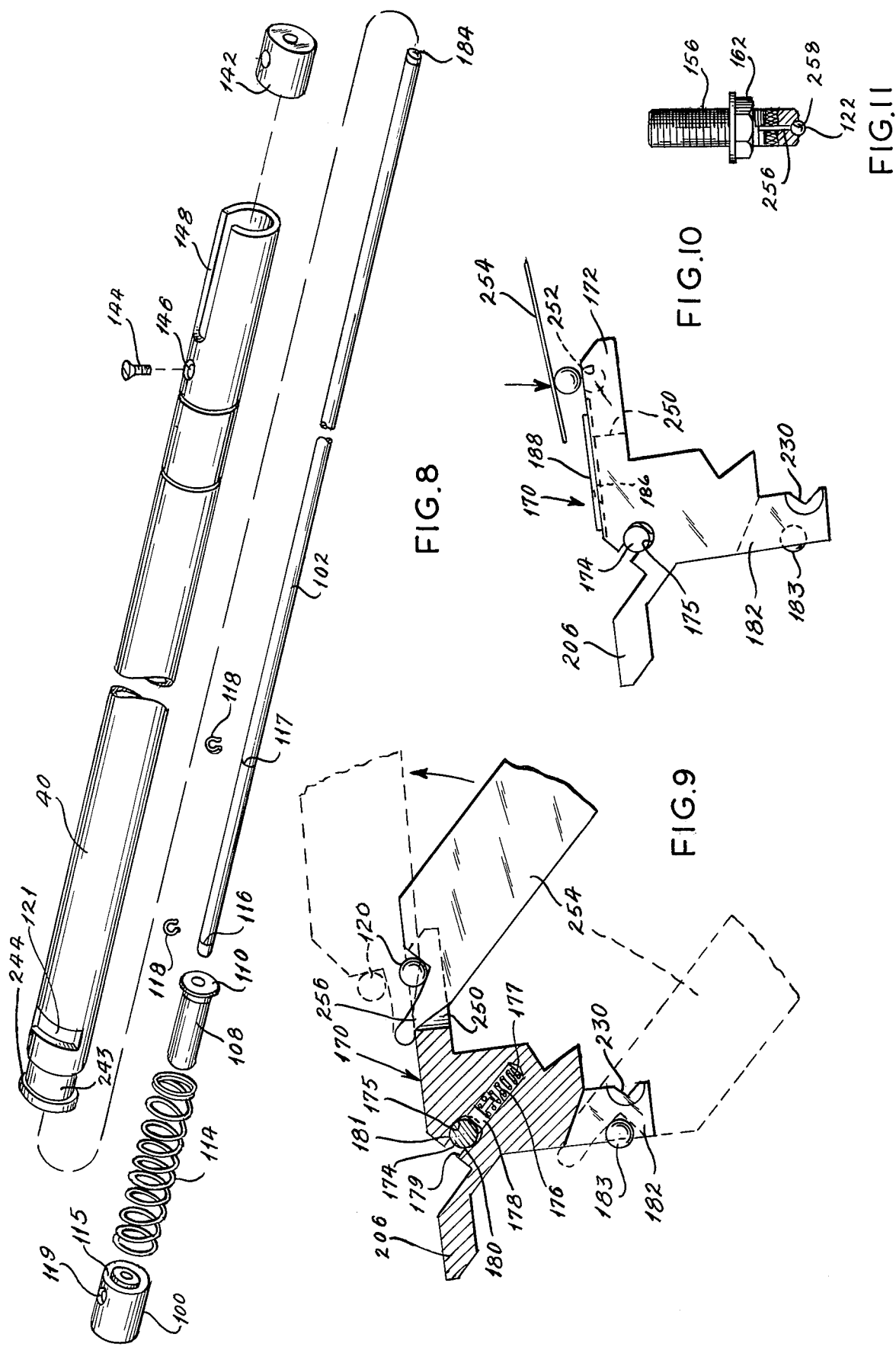

RETRACTABLE DIAL BORE GAUGE

DESCRIPTION OF THE PRIOR ART

Many pieces of machinery and other devices have internal surfaces or bores that are used for a large variety of purposes. There has been a continuing need to be able to accurately measure the diameter and surface characterisitics of such holes or bores for a variety of reasons. This need has been met in the past by a variety of devices some of which include gauges of various types including dial bore gauges which have members which engage the surfaces being meaured and dials which are connected to the work engaging portions to indicate the condition and size of the hole or bore. Representative of the prior art gauging devices are the devices shown in U.S. Pat. Nos. 2,454,246; 3,081,548 and 3,225,447.

One of the shortcomings of all known gauging devices is their inability to be able to be moved from one portion of a bore to another easily and quickly. This is due to the fact it has not been possible to move the work engaging portions including the gauging portions and the centralizing portion for locating the gauging portions on a diameter of the work being gauged from an extended to a retracted condition and to maintain the retracted condition so that the work engaging members can be moved from one part of a bore to another and from different portions of the same or similar bores such as across a land formed in a bore between spaced bore portions without encountering difficulties and without making it difficult to remove the gauge once a measurement has been completed. Also, by not being able to retract the work engaging portions of known gauges has meant that it has been necessary to press the work engaging portions against the work surface and to rub them on the work surfaces being measured to relocate or install or remove the gauge. This has caused premature wear of the work engaging members, it has strained sensitive portions of the gauges, and has resulted in inaccuracy and unreliability of the results obtained. Still further, when known gauges are inserted or removed from relatively long bores, especially from long bores formed by spaced bore portions, it has usually been necessary to tilt them often rubbing them against the edges of the bores, and to apply excessive pressure against the work engaging elements or some of them in order to be able to withdraw or insert the gauge into the work. These disadvantages have also caused bending and/or twisting of critical parts in the known constructions all of which is undesirable. The present gauge construction overcomes these and other disadvantages of the known constructions and teaches the construction and operation of an improved dial bore gauge characterized by having retractable work engaging elements. The present invention also teaches means by which the work engaging portions of a gauge can be easily and quickly relocated to compensate for wear of the work engaging portions.

It is therefore a principal object of the present invention to provide an improved and more versatile dial bore gauge.

Another object is to facilitate the insertion and removal of a dial bore gauge into and from a work surface.

Another object is to minimize undesirable wear and tear on the work engaging elements and on other elements associated therewith in a dial bore gauge.

Another object is to make it possible to more accurately measure the diameter, the surface and other characteristics of surfaces including surfaces formed by bores having spaced bore portions separated by cutouts, lands or other separations.

Another object is to enable the accurate gauging of all portions of surfaces such as cylindrical surfaces and especially of relatively long cylindrical surfaces.

Another object is to teach the construction and operation of a dial bore gauge which can be accurately and reliably used even by persons having relatively little skill and training.

Another object is to prolong the life of the work engaging elements on a dial bore gauge.

Another object is to relocate the work engaging portions of a gauging device.

Another object is to make possible the accurate gauging of a greater variety of surfaces and surface characteristics.

Another object is to provide a dial bore gauge which can be constructed to cover many different ranges of bore sizes and which is convenient and easy to use and to operate.

These and other objects and advantages of the present invention will become apparent after considering the following detailed specification which discloses several different embodiments of the subject device in conjunction with the accompanying drawings wherein:

FIG. 1 is a front elevational view of a dial bore gauge constructed according to a preferred form of the subject invention;

FIG. 2 is a side elevational view of the gauge of FIG. 1;

FIG. 3 is a rear view of the gauge shown in FIG. 1;

FIG. 6 is a fragmentary side elevational view taken on line 6—6 of FIG. 1;

FIG. 8 is an enlarged exploded perspective view of operative means that connect the dial and gauge portions of the subject device;

FIG. 9 is an enlarged cross-sectional view taken through the center of the movable gauge portion of the subject gauge, said view also showing in solid and phantom outline a tool used to remove and relocate the wear portions thereof;

FIG. 10 is a side view of the movable gauge portion showing the tool being used to reseat a work engaging member thereon;

FIG. 11 is an enlarged side view of the stationary work engaging contact assembly;

FIG. 12 is a side elevational view of a modified form of the subject dial bore gauge; and, FIG. 13 is an enlarged fragmentary cross-sectional view of the dial end portion of the modified gauge of FIG. 12.

Figure 4:
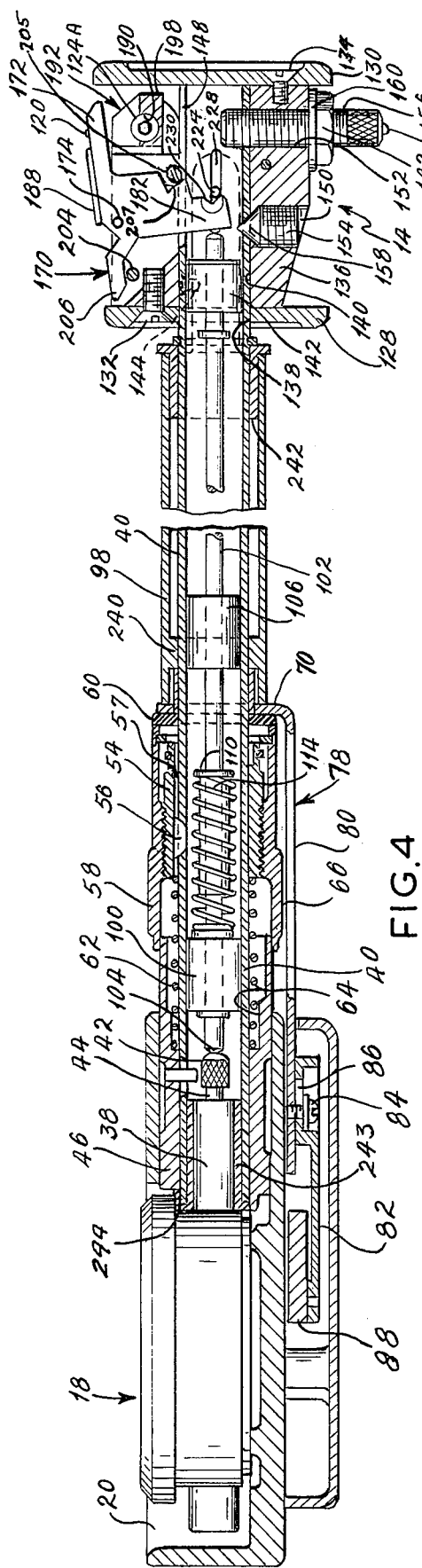
FIG. 4 is an enlarged cross-sectional view taken on line 4—4 of FIG. 1.

Referring to the drawings more particularly by reference numbers, number 10 identifies a dial bore gauge constructed according to a preferred form of the present invention. The gauge 10 includes a dial end portion 12, a gauging end portion 14, and means 16 connecting the dial and gauging portions 12 and 14.

The dial portion 12 includes a dial indicator assembly 18 which is mounted in a housing 20. The housing 20 is shown or illustrative purposes as being cup-shaped and as having an open front which exposes the face 22 of the indicator 18 and a substantially annular side wall portion 23 which is connected to a closed rear wall. The housing 20 also has an integral extension portion 24 which cooperates with one end of the connection means 16 which connects the dial portion 12 to the gauging portion 14. The face 25 of the dial 22 includes an annular graduated scale 26 which cooperates with a rotatable pointer 28 to indicate a reading. The face of the dial 22 also includes a smaller graduated scale 30 with its own associated movable pointer 32. The scale 30 and the pointer 32 cooperate to register the number of full rotations made by the pointer 28 during a gauging operation thereby substantially increasing the range of the instrument. In an actual gauge one complete rotation of the pointer 32 on the scale 30 indicates ten full scale readings or rotations of the pointer 28 on the scale 26.

The face 25 on which the scale 26 is located is mounted in the assembly 18 and the assembly is located in the housing 20. The scale 26 is rotatable relative to the housing 20 for adjustment so that the zero point on the scale can be located at any desired place at the discretion of the operator. It is an advantage to be able to relocate the position of the dial scale 30 for various purposes including for convenience purposes. Once the position of the scale 26 has been set, it can be locked in position against further movement by means of threaded locking member 34 and associated brake member 36 which is positioned to bear against the indicator assembly 18. The indicator assembly 18 has a tubular or stem portion 38 which extends from one side thereof into one end of a tubular member 40 which extends through the connection portion 16. The assembly 18 has an operator member 42 located on the end of an operator shaft 44 and the shaft 44 extends through the tubular stem 38 and cooperates with means located in the dial portion 18 which causes the pointers 28 and 32 to rotate in response to movements thereof. The construction and operation of the dial portion 18 may be well known, and these features are not at the heart of the invention.

Another tubular member 46 has a portion that is positioned extending between the tubular member 40 and the housing extension 24. A set screw 48 located in a threaded passage in the member 46 is accessible for receiving a wrench such as an Allen wrench through a hole 50 in the extension 24. The set screw 48 is tightened to prevent relative movement between the members 40 and 46. Another set screw 52 is threadedly positioned in a bore in the housing extension 24 and bears against the outer surface of the member 46 to prevent relative movement between these members.

The tubular member 40 extends from the dial assembly 18 through the connection means 16 to the gauge end portion 14. Another tubular member 54 which has external threads is mounted on the member 40 and is keyed thereto by key 56 which is positioned in groove 57 in the member 54. Internal threads on adjustment member 48 threadedly engage the external threads on the member 54, and the member 58 is rotatable in either direction thereon to change an adjustment of the gauge as will be explained. The member 58 has an annular inwardly extending portion 60 on one end which rotates in a fixed position with the member 58 when the member 58 is rotated. A compression spring 62 is positioned on the tube 40 and has one end engaged with a shoulder formed on the member 54 and an opposite end which extends into an annular cavity formed by an inside groove 64 in the member 46 and the adjacent outer surface of the member 40. The adjustment member 58 has a knurled outer surface 66 which the operator holds when making an adjustment. When an adjustment is being made, the member 58 is rotated relative to the threaded member 54 and in so doing moves the member 54 axially to change its position on the member 40 and to change the compression of the spring 62. The spring 62 is included in the device to provide means to adjust the force required to retract the gauging members. The more the spring 62 is compressed by moving the members 54 toward the dial portion 18 the greater will be the force required to be applied to retract the device. The spring 62 also serves to minimize backlash in the dial portions. This will be explained more fully in connection with the description of the retraction mechanism as disclosed particularly in FIG. 3.

The end of the member 58 opposite from the dial portion 18 of the gauge has the inwardly extending thrust washer 60 attached thereto. The washer 60 abuts an annular portion 70 of a retractor member 78 and turns relative thereto when the member 58 is rotated to produce the desired operating pressure adjustment for the spring 62. The annular portion 70 is an integral part of the retractor member 78 that extends along the rear side if the subject device. The retractor 78 includes an arm portion 80 which extends between one side of the annular portion 70 and an opposite end which has a slide connection to another member 82. The connection is produced by threaded member 84 which is fixedly attached to the arm 80 and slideable in an elongated opening 86 formed in a cup-shaped end portion of the member 82. The opening 86 and the threaded member 84 to provide the connection between the members 80 and 82.

The member 82 is pivotally connected to a bell crank 88 which is part of the retraction mechanism, and the bell crank 88 is mounted for pivotal movement on the rear wall of the dial housing 20 at 92 (FIG. 3). The bell crank 88 has an operator portion that includes operator lever 94 which extends outwardly therefrom at an acute angle relative to the axis of the connection portion 16 of the subject device. When the lever 94 is depressed by moving it toward the portion 16, the bell crank 88 moves clockwise about the pivot 92 as shown in FIG. 3, and in so doing moves the member 82, which is pivotally connected thereto at 93. Thereafter, further depression of the lever 94 acts to move the retractor member 80 including the annular end portion 70 thereof and the parts engaged therewith toward the dial portion 18 of the device. The parts moved by the retraction mechanism in this way include the members 58 and 54 and various portions of the connection means 16 as will be described. It should be clearly understood that the the purpose of the retraction mechanism is to provide a way to retract at least one and in some cases more of the work engaging elements on the subject gauge in order to reduce the gauging diameter and thereby to make it possible to insert and remove the gauge from a work surface, and especially a long or deep work surface or bore including bores formed with spaced portions to be gauged without rubbeing the work engaging members on the work. This can be done with the present gauge without rubbing the work engaging members or elements on the work and without having to twist, press, bend or otherwise distort or apply undesirable pressure on the gauge or on the work. It is important as stated that the retraction means be able to retract the centering means as well as at least one of the gauging points as will be described later. Note also that when the retraction mechanism is operated it operates to apply force against the spring 62 to further compress it.

Some of the portions of the gauge that are moved during a retraction operation in addition to the portions 78, 58 and 54 include tubular member 98, a tubular sleeve 100 and an operator rod 102 which extends through the sleeve 100 and through outer similar sleeves located in the tube 40. These elements will be described more fully in connection with FIG. 8. When the rod 102 moves to the left during a retraction operation as shown in the drawings its end surface 104 moves the dial operator plunger member 42 to the left which is the direction that causes the dial 18 to be moved to an inoperative condition.

The rod 102 is supported and mounted for movement in a plurality of spaced tubular sleeves fixedly positioned in the tube 40 such as the sleeve 100 and one or more other similar sleeves such as the sleeve 106 (FIG. 4). The rod 102 has another elongated smaller diameter sleeve or spool 108 mounted on it, and the spool 108 has a larger diameter annular flange 110 at one end. A compression spring 114 is mounted on the spool 108 and extends between the flange 110 at one end and a shoulder 115 formed on one end of the sleeve 100. The sleeve 100 and the spool 108 are mounted on the rod 102 between two annular grooves 116 and 117 which receive spring clips 118. When installed on the rod 102 in the manner described the spring 114 is under compression. The purpose of the spring 114 is to urge the rod 102 in a direction toward the gauging end of the instrument. This is done to maintain outward pressure on the work engaging elements during a gauging operation so that these members will normally remain engaged with the work. This is essential to proper operation of the subject device. To accomplish this, the sleeve 100 has a socket 119 which is exposed through opening 121 in the tube 40 in position to receive a threaded locking member which is tightened into locked position when the subject device is assembled to lock the member 100 against movement. This means that the spring 114 will normally urge the spool 108 and the rod 102 in the tube 40 in a direction toward the work engaging end portion 14.

The work engaging end portion 14 of the gauge 10 has two diametrically opposite work engaging elements 120 and 122 which are the elements that engage opposite sides of a diameter of a surface being gauged. To be sure that the elements 120 and 122 are located on a diameter of the work surface, the subject gauge includes two other work engaging members called centering members 124 and 126 which are located to engage the work at spaced locations on opposite sides of the movable gauging element 120. The gauging element 120 and the two centering members 124 and 126 are retractable on the device in a manner and by means which will be explained. The means for retracting these elements are important to the invention, and the retractable feature enables the subject gauge to be moved into and out of bores including deep bores and surfaces formed by spaced bore portions without having any of the work engaging members move or rub on the work surface during insertion and removal of the gauge thereform. This is to be distinguished from all known gauges used for the same and similar purposes.

The construction and operation of the gauging portion 14 is illustrated in several different figures including especially FIGS. 4, 5, 6 and 7. The gauge portion 14 includes two different diameter spaced round end wall members 128 and 130 which are connected by screws 132 and 134 to opposite ends of a member 136. The wall member 128 and the member 136 have registered openings 138 and 140 which receive one end of the tubular member 40. The tube 40 also receives a tubular bushing 142 (FIGS. 4 and 8) which is held in fixed position therein by threaded member 144 which extends through and cooperates with a tapered bore 146 in the tube 40. The tube 40 has an elongated slot 148 formed in one side and the slot extends to the end thereof that is positioned in the member 136. The slot 148 is provided to accommodate the movable work engaging portions as will be described. The member 136 has two threaded bores 150 and 152 which respectively receive threaded member 154 and 156. The threaded member 154 has a tapered end portion 158 which bears against a tapered seat formed on the tube 40 to lock the tube in fixed positions in the member 136.

The threaded member 156 on the other hand carries the fixed work engaging member 122 and is adjusted and tightened in position by means of a washer 160 and a lock nut 162. The threaded member 156 may also extend through an aligned hole in the tube 40. Adjustment of the member 156 adjusts the radial position of the work engaging member 122, and this is important to the setting of the subject device. The construction of the member 156 and the manner in which the member 122 is mounted thereon will be described more fully hereinafter in connection with FIG. 11. It is sufficient at this point to note that the gauging point or contact 122 is shown as a round ball-like member formed of a relatively hard wear resistant material and is mounted in a socket provided therefor in the end of the member 156 by forcing it into the socket. It is important that the threaded members 156 and 154 be accurately maintained in the manner described since they control the location of the tube 40 and of the gauging point 122, and the accuracy of the gauge in large part depends on the care and accuracy with which these parts are made and located.

The movable work engaging gauging member 120 is mounted on a pivotal assembly 170 which includes an arm portion 172 on which the gauging member 120 is located. The assembly 170 is rotatably mounted for movement on a shaft 174 that extends across a space formed by and between two spaced portions 136A and 136B of the member 136 as clearly shown in FIG. 1. The shaft 174 extends through a somewhat larger diameter bore 175 in the member 170 as clearly shown in FIGS. 9 and 10. The bore 175 intersects with a counterbore 176 in the member 170 which receives a compression spring 177 and a piston 178 positioned as shown. The side of the bore 175 opposite from the counterbore 176 communicates with a gap 179 that forms spaced shoulders 180 and 181. Because of the oversize of the bore 175 compared to the size of the shaft 174 and because of the action of the spring 177 and the pistons 178, the shaft 174 is biased against the shoulders 180 and 181. This positively locates the shaft 174 in the bore 175 and maintains a more accurate location for the member 170. This is an important additional feature which contributes to the long life accuracy of the gauge.

The assembly 170 includes another portion 182 (FIGS. 5, 9 and 10) that extends inwardly past the center of the gauging portion 14. The portion 182 carries a hardened contact member 183 which makes contact with end surface 184 of the rod 102. The contact 183 is biased into continuous engagement with the end surface 184 by spring means to be described so that when radial pressure is applied to work engaging contact 120 to move it radially inwardly on the gauging portion 14, the movement produced thereby is directly transferred through the assembly 170 to the rod 102, and from the rod 102 to the dial portion 18 of the instrument 10.

The pivoted assembly 170 has an elongated slot 186 formed in its outer surface, and a hardened member 188 is positioned in the slot 186 and is held in position therein by staking or otherwise. The rod 188 is normally angularly related to the axis of the gauge (FIGS. 4 and 5), and is included so that it, and not other portions of the gauge, will rub against and engage edges of bores and other surfaces during movement of the device into and out of gauging position. In so doing, the member 188 minimizes the possibility of doing damage to other delicate gauge portion including to the gauge member 120. This is especially important during times when the gauge is being inserted and withdrawn from relatively deep bores.

As mentioned, the gauging portion 14 has two spaced work engaging centralizer members 124 and 126. The centralizers are shown as round members with shaft portions such as shaft portion 124A (FIG. 4). The shaft portions extend into opposite ends of the bore 190 in a support member 192. The support member 192 has spaced side arm portions 194 and 196 (FIG. 1) which are connected by another portion 198 that extends therebetween but at a location behind the movable portion 172 of the pivotal assembly 170. The space between the members 194 and 196 is the space into which the portion 172 is able to move during a gauging operation.

The support member 192 has other side portions or arms 200 and 202 (FIGS. 6 and 7) which extend along opposite sides of the fixed member 136. The support member 192 including the arm portions 194, 196, 200 and 202, as well as the centralizer contacts 124 and 126 mounted thereon, is pivotally mounted on the member 136 by means of another shaft 204. The shaft 204 extends across the space between the portions 194 and 196 through the members 136A and 136B, and pivotally supports the assembly on which the centralizers 124 and 126 are located. Another shaft 205 also extends across the space between the members 136A and 136B at a more central location (FIG. 4) and cooperates with a shoulder 207 on the movable gauge assembly 170 to limit radial outward movement of the movable gauging point 120. This determines the largest possible diameter that can be gauged. The subject gauge therefore has a range over which it can be used and this range, while fairly limited for any one setting or adjustment of the stationary contact 122, is extremely accurate within its range and can be greatly expanded by resetting the stationary gauge member 156 on which the stationary work engaging member 122 is located. Thus with only minor adjustment a single gauge can be used to gauge a large range of bore sizes.

The inwardly extending arms 200 and 202 are used as parts of retraction means for the centralizers 124 and 126. The arms 200 and 202 carry respective threaded nuts 208 and 210, the head portions of which extend sidewardly therefrom for cooperation with respective elongated slots 212 and 214 in other arms 216 and 218 which are parts of a U-shaped operator member 220. The operator member 220 is attached to the end of the tubular member 98 and when the tube 98 is moved to the left as shown in FIGS. 1-5 during a retraction operation, the U-shaped member 220 also moves to the left relative to the tube 40 and relative to the gauging portion 14. In so doing the arm portions 216 and 218 of the member 220 move to the left and the elongated openings or slots 212 and 214 move relative to the screws 208 and 210 providing a lost motion connection. No movement of the centralizers 124 and 126 will take place during the early portions of a retraction operation and until the slots 212 and 214 have moved far enough so that the opposite ends thereof engage the heads of the respect threaded members 208 and 210. Additional movement of the retraction members in the same direction will cause arm portions 194 and 196 to rotate relative to the shaft 204 and this will cause centralizers 124 and 126 to retract by moving inwardly. The retraction of the centralizers takes place by operation of the lever 94 the same as the retraction of the movable gauge member 120. It is important that during a retraction operation the movable gauging point 120 as well as the centralizer members 124 and 126 move radially inwardly. It is possible that the member 120 may commence being retracted before there is any movement of the centralizers, however, this is usually not of particular significance.

Figure 5:
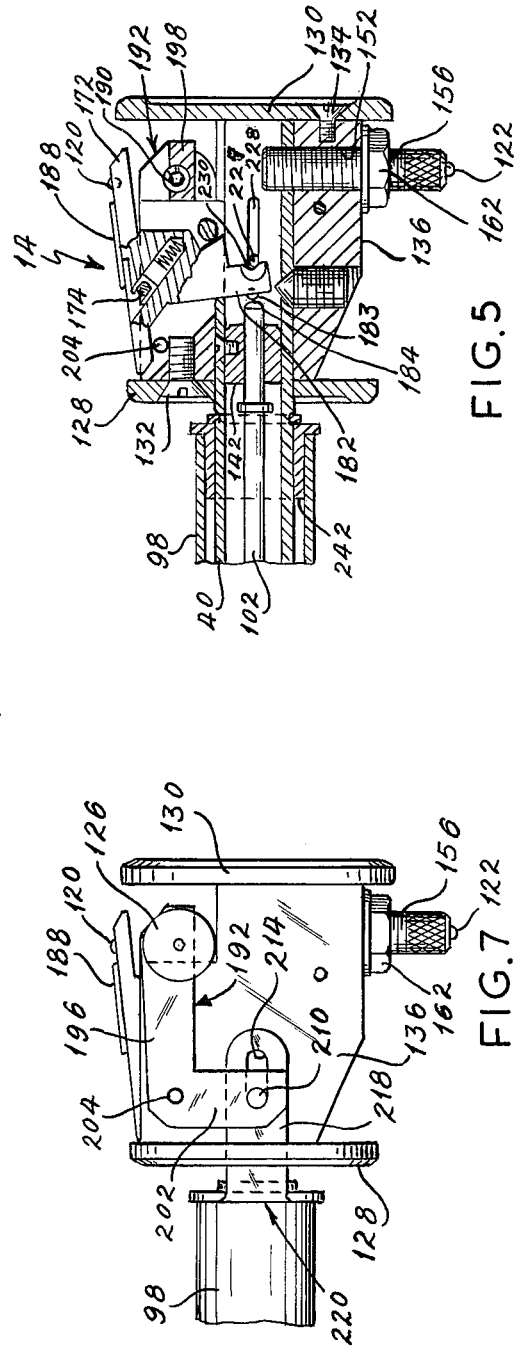
FIG. 5 is an enlarged fragmentary cross-sectional view taken on line 5—5 of FIG. 1.
Figure 7:
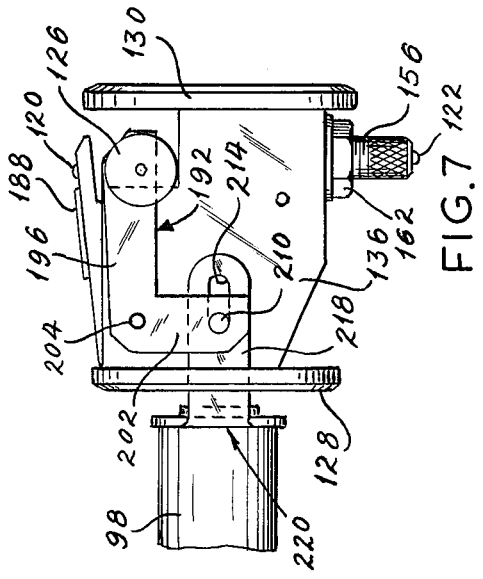
FIG. 7 is a fragmentary side elevational view taken on line 7—7 of FIG. 1.

The arm 216 of the U-shaped member 220 is longer than the arm 218 and the extended portion thereof carries another threaded member 221 (FIG. 6). The head of the threaded member 221 engages and presses against a loop portion of a wire spring member which includes a straight portion 224 that extends through a hole located near the end of the arm 216. The straight wire portion 224 also extends through an elongated slot 228 formed in the portion 136A of the member 136 and cooperates with a V-shaped notch 230 formed in the side of the inwardly extending portion 182 of the movable gauge assembly 170. This puts spring pressure on the assembly 170 in a direction to move the work engaging contact 120 inwardly on the portion 14 in opposition to the force applied against the assembly 170 by the rod 102. During a retraction operation the straight wire portion 224 moves against the notch 230 and in so doing moves the assembly 170 clockwise as shown in FIGS. 2, 4 and 5 to retract the gauging point 120 by moving it radially inwardly. This occurs as the rod 102 moves leftwardly. This also maintains the hardened contact member 183 engaged with the end surface 184 of the rod 102. The retraction operation, including the movement of the rod 102, causes some movement of the pointers 28 and 32 in the dial portion 18 but this is not objectionable and is self-restoring as soon as the retraction operation is completed. In the situation described, the gauge assembly 170 and the dial 18 may undergo some movement before the lost motion connection provided by the slots 212 and 214 operate to retract the centralizers 124 and 126.

The wall portion 136A of the member 136 has another bore 232 (FIG. 6) which receives an adjustment member 234. The adjustment member 234 has an eccentrically located head portion 235 which projects from the side of the portion 136A and cooperates with a rounded cutout 236 formed in the arm portion 194 of the assembly 192. The projecting head portion 235 has a socket 238 formed in it for receiving an Allen wrench which is used to reposition the eccentric head portion 235 relative to the cutout 236. The purpose of the eccentric adjustment means is to adjust and limit how far the centralizers 124 and 126 can move outwardly toward their extended positions. Normally they are maintained in an outwardly extended position on the gauging portion 14 by the action of the spring member 62 located in the connecting portion of the subject device.

The mounting tube 40 is positioned inside of the tube 98, and the tube 98 contains one or more lands or other means such as land 240 and sleeve 242 which act as guides to support the tube 40. The tube 40 also receives an end sleeve 243 with annular outwardly extending flange or collar 244 on one end (FIGS. 4 and 8), and when the tube 40 is moved into the tube 98 the collar 244 abuts the end of the tube 40 which is the end adjacent the dial portion 18. The sleeve 243 receives the portion 38 of the dial through which the shaft 44 extends.

Actuation of the retraction mechanism operates in opposition to the compression force applied to the spring 62 which, as already described, is located in a space surrounding the mounting tube 40 between the opposed surfaces or shoulders on the members 46 and 54. By adjusting the position of the member 58 which is done by rotating it in place, the position of the member 54 is changed and this in turn changes the amount of compression force on the spring 62 and the amount of force required to retract the various work engaging members.

The spring 114 which is mounted on member 108 between the end flange portion 110 and the member 100 is a much weaker spring than the spring 62 and during a retraction operation when the spring 62 is compressed, it is possible for the wire spring 224 to move the pivoted gauging point assembly 170 to a retracted position in opposition to the force of the spring 114. Thereafter the retraction mechanism will operate to retract the centralizers as aforesaid. At all times other than during a retraction operation the spring 114 will maintain force on the rod 102 against the assembly 170 to keep the movable gauging contact 120 in an outward or extended position. As indicated above, the sleeve 100 is locked in fixed position in the tube 40, and any movement of the rod 102 will move the sleeve 108 and its flange 110 against the end of the spring 114 in a direction to compress the spring 114. This will also cause the member 100 to move out of engagement and away from the associated spring clip 118.

An important optional feature of the present dial bore gauge 10 is in the use of removable members for the work engaging members 120, 122 and 183. This feature makes it possible to use hard round members for the work engaging members and to relocate them from time to time as wear occurs. It is anticipated that moderate to heavy usage of the subject gauge may result in some wear particularly of the members 120 and 122 due to repeated usage and rubbing on the work surfaces being gauged. This in time will cause some wear. Since the members 120 and 122 are spherical in shape it is desirable to be able to reposition them on the respective members 170 and 156 on which they are installed. FIGS. 9 and 10 illustrate how the members 120 and 183 are mounted, and how it is possible to relatively easily remove them from their mountings and reinstall them in different positions in the same mountings so as to present different parts of their surfaces to the work to be gauged and to the end surface 184 of the rod 102. To make this possible the end of the arm portion 172 of the member 170 is bifurcated or slotted by making a groove on slot 250 (FIGS. 1, 9 and 10) extending lengthwise from the free end thereof. At some point along the length of the slot 250 an enlargement or socket 252 is formed in the arm 172, which socket is large enough to accommodate the gauging member or ball 120. To remove the ball 120 from the socket 252 a suitable pry tool 254 which has an endwardly extending narrow portion 256 is placed as shown in FIG. 9 and used to pry the ball 120 out of the socket 252. This is possible because of the resiliency provided by the slot 250. In an actual device the slot 250 is located nearer to one side of the arm 172 than the other to increase the resiliency and make it easier for the thinner side to spring out to allow the ball to come out or to be reinstalled. After the ball has been removed it can be placed on the arm 172 above the socket 252 and the same tool 254 or any other suitable member can be used to press on the ball to reposition it in the socket 252. The tool 254 can also be inserted in the slot 250 from the opposite direction and this may be preferred for removal and repositioning of the ball 120 if it is to be done without any disassembling of the gauge. The same procedure can be used to reposition the ball 183 although it is not possible to do so while the member 170 is installed on the gauge. However, the ball 183 does not slide to any substantial amount on the end surface 184 of the rod 102 and therefore does not wear as rapidly as the ball 120.

FIG. 11 shows somewhat similar means for removing and repositioning the ball 122 on the member 156. The member 156, like the member 170 is slotted at 256, and the slot 256 can receive a tool similar to the tool 254 which is used to pry the ball 122 out of socket 258. To do this it is usually necessary to back off on the nut 162 until it clears the slot 256.

FIGS. 12 and 13 show a modified form 300 of the subject dial bore gauge which is similar in overall structure and operation to the construction already described. The main difference between the gauges 10 and 300 is in the form of the retraction mechanism. In the gauge 300 a pistol grip 302 is provided which is not true of the gauge 10. The pistol grip 302 is hingedly attached to the dial portion 304 of the gauge by hinge means 306 which are preferably a friction hinge means constructed to hold any position in which they are set. The grip 302 can be moved to an in operative position substantially aligned with the device for ease of handling and storing when not is use. The modified gauge 300 has a trigger member 308 which includes an annular portion 310 that corresponds to the annular portion 70 on the gauge 10 (see FIG. 4). When the operator holds the pistol grip 302 in his hand his finger can operate the trigger 308 to retract the movable working engaging member and the centralizers. The retraction mechanisms involved, except for the parts just described, may be the same as in the gauge 10.

Thus there has been shown and described a novel dial bore gauge construction with retraction means which fulfills all of the objects and advantages sought therefor. It is apparent, however, that many changes, variations, modifications and other uses and applications for the subject gauge are possible, and all such changes, variations, modifications, and other uses and applications which do not depart from the spirit and scope of the invention are deemed covered by the invention which is limited only by the claims which follow.

What is claimed is:

1. In a dial bore gauge for measuring the size and surface characteristics of a cylindrical work surface, said gauge including dial means including a scale and means to indicate a reading on the scale, a work engaging portion including spaced opposed work engaging contacts for engaging opposite sides of a surface to be gauged, one of said work engaging contacts being fixedly positioned on the work engaging portion and the other being movable along an arcuate path primarily in a radial direction thereon, a pair of other work engaging members on the work engaging portion located at spaced locations on opposite sides of one of said work engaging contacts, and means connecting the dial means with the work engaging portion of the gauge, the improvement comprising a first member pivotally mounted on the work engaging portion, said first member having angularly related portions one of which includes means on which the movable work engaging contact is located, and means on said gauge engageable with the other angularly related portion of said first pivotal member biasing said movable work engaging contact outwardly on the work engaging portion whereby said work engaging contacts are able to engage opposite sides of a cylindrical surface being gauged, second means including a second member pivotally mounted on the work engaging portion for supporting the spaced pair of work engaging members, said second pivotal member having angularly related portions one of which supports the spaced work engaging members, means engageable with the other angularly related portion biasing said second pivotal member and said pair of spaced work engaging members mounted thereon outwardly into engagement with the surface being gauged, and means operable to retract the movable work engaging contact and the spaced pair of work engaging members on the work engaging portion, said retraction means including an operator member having separate operative connections to the first and second pivotal members.

2. In the dial bore gauge of claim 1 the further improvement of means forming a resiliently yieldable connection between the operator member and the movable work engaging contact.

3. In the dial bore gauge of claim 1 the further improvement that the means operable to retract the movable work engaging contact include means associated therewith for moving the spaced work engaging members to a retracted position on the work engaging member during operation of the retract means.

4. In the dial bore gauge of claim 1 means to predeterminately vary the outwardly directed force of the pair of other work engaging members.

5. In the dial bore gauge of claim 1, adjustment means on the work engaging portion of the gauge to predeterminately adjust the outwardmost limit of movement of the spaced work engaging members.

6. In the dial bore gauge of claim 1 wherein the dial means and the work engaging portion are connected by a tubular member that extends therebetween, a rod having spaced opposite end surfaces positioned for longitudinal movement in the tubular member, the dial means on the gauge including means engageable with one of the rod end surfaces, means associated with the first pivotal member on which the movable work engaging contact is positioned engageable with the other rod end surface, and means urging the rod toward the work engaging portion of the gauge, said last named means moving the rod against the said other of the angularly related portions of the first pivotal member whereby said one portion on which the movable gauging contact is mounted pivots outwardly to increase the distance between the opposed work engaging contacts.

7. In the dial bore gauge of claim 1, means on the work engaging portion engageable by the first pivotal member to limit angular movement thereof to control the outermost position to which the movable work engaging contact can move.

8. In the dial bore gauge of claim 1, pivot means on the work engaging portion for pivotally supporting the first pivotal member thereon, said pivot means including a shaft fixedly positioned on the work engaging portion and an opening through the first pivotal member for cooperatively engaging said shaft, said opening including a round portion having a diameter larger than the diameter of the shaft and a slot portion extending outwardly from one side of the round portion, said slot and said round portion forming a pair of spaced shoulders, and means in said first pivotal member biasing said shaft into engagement with said pair of spaced shoulders.

9. In the dial bore gauge of claim 1 wherein said first pivotal member is bifurcated adjacent to the end of the first angularly related portion thereof, a socket formed by and between the bifurcated end portions thereof, said movable gauging contact including a ball member of a size to be pressed into resilient engagement in said socket.

10. In a dial bore gauge for measuring the size and surface characteristics of cylindrical work surfaces, said gauge including dial means for indicating the reading and including a scale and means for indicating a reading on the scale, a work engaging portion including spaced opposed work engaging contacts for engaging opposite sides of a cylindrical surface to be gauged, one of said work engaging contacts being fixedly positioned on the work engaging portion and the other being movable along an arcuate path primarily in a radial direction thereon, a pair of other work engaging members on the work engaging portion at spaced locations on opposite sides of one of said work engaging contacts, and means operatively connecting the dial means with the work engaging portion of the gauge, the improvement comprising means for mounting the movable work engaging contact on the work engaging portion including a shaft fixedly supported on the work engaging portion and a member pivotally mounted on said shaft, said pivot member having an opening therethrough for receiving said shaft, said opening having a diameter larger than the diameter of the shaft and a pair of spaced shoulders formed on one side of said opening, biasing means located on said pivotal member and engageable with said shaft to bias the shaft into engagement with said spaced shoulders, said pivotal member having a first arm portion extending therefrom to a free end, a hardened work engaging member mounted on said arm and adjacent to said free end to form said movable work engaging contact, and a second arm portion, and means operatively connecting said second arm portion with the means for indicating the reading on the scale, said last means including means normally biasing the pivotal member in a direction to move the movable work engaging contact along an arcuate path about the said shaft primarily in a radial outward direction 11. A dial bore gauge comprising a dial portion, a work engaging portion, and means operatively connecting the dial and work engaging portions, including a rod member having spaced exposed end surfaces, said dial portion including a face plate with a scale thereon and a pointer movable relative to the face plate and relative to the scale to give a reading, means operatively engageable with the pointer to move the pointer relative to the scale including actuating means operatively engaged with the pointer and biased into engagement with one of said rod end surfaces, said means operatively connecting the dial and work engaging portions of the gauge including means to support the rod member for longitudinal movement, said work engaging portion including a pair of spaced opposed relatively movable work engaging contacts one of which is fixedly positioned on the work engaging portion, means including a bell crank member having first and second angularly related portions pivotally mounted on the work engaging portion, the other of said work engaging contacts being mounted on said first angularly related bell crank portion for arcuate movement in a substantially radial direction during pivotal movement thereof, the second angularly related bell crank portion engaging the other of said spaced opposed rod end surfaces, means including the rod member normally biasing the movable work engaging contact outwardly along an arcuate path to a radially extended position on the work engaging portion of the gauge, means including an operator member pivotally mounted adjacent to the dial portion of the gauge and operatively engageable with the rod member, said operator member being movable between a first position in which the movable work engaging contact is able to move radially outwardly on the work engaging portion away from the stationary work engaging contact and a second position in which the movable work engaging contact moves along the arcuate path to a retracted position, and means to position the opposed work engaging contacts on a diameter of a cylindrical surface to be gauged, said positioning means including a pair of spaced work engaging centralizer members located on the work engaging portion on opposite sides of one of said work engaging contacts, a second bell crank member mounted on the work engaging portion having angularly related portions, means on one of said angularly related portions for supporting the centralizer members, means engageable with the other angularly related portion biasing the centralizer members outwardly toward radially extended positions on the work engaging portion, said operator member having a separate operable connection with the second bell crank member for moving the centralizer members inwardly along an arcuate path to a retracted position when the operator member is moved to its second position.

12. The dial bore gauge of claim 11 including means to adjust the outermost extended position of the centralizer members.

13. The dial bore gauge of claim 12 wherein said means to adjust the outermost extended position of the centralizer member includes a threaded adjustment member engageable with the second bell crank member.

14. The dial bore gauge of claim 11 including means on the work engaging portion to limit outward movement of the movable work engaging contact.

15. The dial bore gauge of claim 11 including means on the work engaging portion to limit outward radial movement of the centralizer members, said last named means including means to adjust the limit of outward movement of the centralizer members.

16. A dial bore gauge comprising a dial portion, a work engaging portion, and means operatively connecting the dial and work engaging portions, including a rod member having spaced opposed end surfaces, said dial portion including a face plate with a scale thereon and a pointer movable relative to the face plate and relative to the scale to give a reading, means operatively engageable with the pointer to move the pointer relative to the scale including actuating means operatively engaged with the pointer and biased into engagement with one of said rod end surfaces, said means operatively connecting the dial and work engaging portions of the gauge including means to support the rod member for longitudinal movement, said work engaging portion including a pair of spaced opposed relatively movable work engaging contacts one of which is fixedly positioned on the work engaging portion, means including a bell crank member having first and second angularly related portions pivotally mounted on the work engaging portion, the other of said work engaging contacts being mounted on said first angularly related bell crank portion for arcuate movement in a substantially radial direction during pivotal movement thereof, the second angularly related bell crank portion engaging the other of said spaced opposed rod end surfaces, means including the rod member normally biasing the movable work engaging contact outwardly along an arcuate path to a radially extended position on the work engaging portion of the gauge, means including an operator member pivotally mounted adjacent to the dial portion of the gauge and operatively engageable with the rod member, said operator member being movable between a first position in which the movable work engaging contact is able to move radially outwardly on the work engaging portion away from the stationary work engaging contact and a second position in which the movable work engaging contact moves along the arcuate path to a retracted position, said one angularly related portion of the bell crank member has a free end formed by spaced connected portions of different thickness located on opposite sides of a slot formed therebetween, a socket formed by and between said connected end portions, a ball-shaped contact member formed of hard wear resistant material of a size to be formed into said socket.

17. A dial bore gauge comprising a dial portion, a work engaging portion, and means operatively connecting the dial and work engaging portions, including a rod member having spaced opposed end surfaces, said dial portion including a face plate with a scale thereon and a pointer movable relative to the face plate and relative to the scale to give a reading, means operatively engageable with the pointer to move the pointer relative to the scale including actuating means operatively engaged with the pointer and biased into engagement with one of said rod end surfaces, said means operatively connecting the dial and work engaging portions of the gauge including means to support the rod member for longitudinal movement, said work engaging portion including a pair of spaced opposed relatively movable work engaging contacts one of which is fixedly positioned on the work engaging portion, means including a bell crank member having first and second angularly related portions pivotally mounted on the work engaging portion, the other of said work engaging contacts being mounted on said first angularly related bell crank portion for arcuate movement in a substantially radial direction during pivotal movement thereof, the second angularly related bell crank portion engaging the other of said spaced opposed rod end surfaces, means including the rod member normally biasing the movable work engaging contact outwardly along an arcuate path to a radially extended position on the work engaging portion of the gauge, means including an operator member pivotally mounted adjacent to the dial portion of the gauge and operatively engageable with the rod member, said operator member being movable between a first position in which the movable work engaging contact is able to move radially outwardly on the work engaging portion away from the stationary work engaging contact and a second position in which the movable work engaging contact moves along the arcuate path to a retracted position, said one work engaging contact including an elongated member threadedly mounted for radial adjustment on the work engaging portion of the gauge, means for locking the threaded member in different radially extended positions thereon, said threaded member having an elongated slot extending therein from the radial extended end thereof to bifurcate said radially extended end, a socket formed in the radially extended end of said threaded member, a ball member formed of relatively hard wear resistant material positioned in said socket, said slot intersecting the socket formed therein, the bifurcated portion of said threaded member enabling the socket portions on opposite sides of the slot to move resiliently apart to admit the ball member into the socket.

18. Means to mount a first member in a second member comprising a spherical first member having predetermined hardness and wear characteristics, a second member having a portion with a socket formed therein, said socket being positioned adjacent one side thereof, and of a size and shape to receive and support the first member therein, a groove formed in the second member at a location to intersect the socket at an intermediate location, the portions of said second member on opposite sides of the groove resiliently yielding relative to each other to permit movement of the first member into and out of the socket, said second member including an elongated portion and the socket is formed adjacent to one side thereof, said groove extending longitudinally from the end of said elongated portion a distance substantially greater than the diameter of the socket.

19. Means to mount a first member in a second member comprising a spherical first member having predetermined hardness and wear characteristics, a second member having a portion with a socket formed therein, said socket being of a size and shape to receive and support the first member therein, a groove formed in the second member at a location to intersect the socket at an intermediate location, the portions of said second member on opposite sides of the groove resiliently yielding relative to each other to permit movement of the first member into and out of the socket, the second member being an elongated member having an end portion, said socket being formed in the end portion, said groove extending into said elongated member from the socketed end portion a distance substantially greater than the diameter of the socket.

20. Means to mount a first member in a second member comprising a spherical first member having predetermined hardness and wear characteristics, a second member having a portion with a socket formed therein, said socket being positioned adjacent one side thereof, and of a size and shape to receive and support the first member therein, a groove formed in the second member at a location to intersect the socket at an intermediate location, the portions of said second member on opposite sides of the groove resiliently yielding relative to each other to permit movement of the first member into and out of the socket, the groove formed in the second member bifurcating a portion thereof, the portions of the second member difurcated by the groove being of different thickness in opposite sides of the groove.

* * * * *

UNITED STATES PATENT OFFICE
CERTIFICATE OF CORRECTION

Patent No. 4,045,877          Dated September 6, 1977

Inventor(s) Harold T. Rutter

It is certified that error appears in the above-identified patent and that said Letters Patent are hereby corrected as shown below:

Column 3, line 59, "48" should be "58"

Column 4, line 26, "if" should be "of"

Column 4, line 33, omit "to" after 84

Column 4, line 53, omit "the" after "the"

Column 4, line 61, "rubbeing" should be "rubbing"

Column 5, line 8, "outer" should be "other"

Column 10, line 41, "in operative" should be "inoperative"

Column 16, line 33, "difurcated" should be "bifurcated"

Signed and Sealed this

Twenty-fourth Day of January 1978

[SEAL]

Attest:

RUTH C. MASON
Attesting Officer

LUTRELLE F. PARKER
Acting Commissioner of Patents and Trademarks